United States Patent
Katayama et al.

(10) Patent No.: US 10,997,046 B2
(45) Date of Patent: May 4, 2021

(54) INTEGRITY CHECK STAGING

(71) Applicant: LENOVO (SINGAPORE) PTE. LTD., Singapore (SG)

(72) Inventors: Yosuke Katayama, Yokohama (JP); Yuichiro Seto, Yokohama (JP); Ken Sasaki, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 24 days.

(21) Appl. No.: 16/738,264

(22) Filed: Jan. 9, 2020

(65) Prior Publication Data

US 2021/0089416 A1 Mar. 25, 2021

(30) Foreign Application Priority Data

Sep. 20, 2019 (JP) .............................. JP2019-171502

(51) Int. Cl.
*G06F 11/22* (2006.01)
*G06F 13/20* (2006.01)

(52) U.S. Cl.
CPC ...... *G06F 11/2284* (2013.01); *G06F 11/2221* (2013.01); *G06F 13/20* (2013.01)

(58) Field of Classification Search
CPC ... G06F 11/2284; G06F 11/2221; G06F 13/20
See application file for complete search history.

(56) References Cited

U.S. PATENT DOCUMENTS

| | | | | |
|---|---|---|---|---|
| 2015/0134978 A1* | 5/2015 | Henry | .................... | G06F 21/572 713/194 |
| 2015/0143172 A1* | 5/2015 | Huang | ................ | G06F 11/2284 714/15 |
| 2017/0046517 A1* | 2/2017 | Henry | ..................... | G06F 21/78 |
| 2017/0085383 A1 | 3/2017 | Dell | | |
| 2017/0098080 A1* | 4/2017 | Henry | ................... | G06F 9/4401 |
| 2017/0373839 A1 | 12/2017 | Intel | | |
| 2019/0384684 A1* | 12/2019 | Chaiken | .............. | G06F 11/2284 |
| 2020/0233676 A1* | 7/2020 | Jindo | .................... | G06F 9/4406 |

FOREIGN PATENT DOCUMENTS

| | | | | | |
|---|---|---|---|---|---|
| EP | 2977889 A1 * | 1/2016 | ......... | H04L 41/0853 | |
| JP | 2009508272 A | 2/2009 | | | |
| JP | 2014021953 A | 2/2014 | | | |
| JP | 2017076285 A | 4/2017 | | | |
| JP | 2019109842 A | 7/2019 | | | |
| WO | WO-2019059148 A1 * | 3/2019 | ........... | G06F 21/602 | |
| WO | WO-2020063001 A1 * | 4/2020 | | | |

* cited by examiner

*Primary Examiner* — Matthew M Kim
*Assistant Examiner* — Indranil Chowdhury
(74) *Attorney, Agent, or Firm* — Shimokaji IP

(57) ABSTRACT

An information processing apparatus includes a BIOS storage unit that stores at least a Basic Input Output System (BIOS) program, a main controller that starts up an operating system by executing the BIOS program, and a sub-controller that manages peripheral apparatuses and accesses the BIOS storage unit, in which the sub-controller includes a digest computation unit that computes a digest value on the basis of BIOS program data stored in the BIOS storage unit in parallel to execution of a process in the main controller, and in which the main controller determines validity of the BIOS program on the basis of the digest value.

7 Claims, 7 Drawing Sheets

INTEGRITY CHECK STAGING

FIELD OF THE INVENTION

The present invention relates to an information processing apparatus.

BACKGROUND OF THE INVENTION

In an information processing apparatus such as a personal computer, when an operating system (hereinafter, referred to as an OS) is started up, a power on self test (POST) process is executed (for example, refer to Japanese Unexamined Patent Application Publication No. 2017-76285). The POST process includes integrity checking for a program such as Basic Input Output System (BIOS).

SUMMARY OF THE INVENTION

Meanwhile, in recent years, a storage capacity of a BIOS memory storing a BIOS program has been increased due to increases of functions of an information processing apparatus. Thus, in an information processing apparatus of the related art, the time required for integrity checking for a program such as a BIOS tends to increase, and thus there is a problem in that a startup time of a system increases.

The present invention has been made to solve the problem, and an object thereof is to provide an information processing apparatus capable of reducing a system startup time.

In order to solve the problem, an information processing apparatus according to the first aspect of the present invention includes a BIOS storage unit that stores at least a Basic Input Output System (BIOS) program; a main controller that starts up an operating system by executing the BIOS program; and a sub-controller that manages peripheral apparatuses and from which the BIOS storage unit is accessible, in which the sub-controller includes a digest computation unit that computes a digest value on the basis of BIOS program data stored in the BIOS storage unit in parallel to execution of a process in the main controller, and in which the main controller determines validity of the BIOS program on the basis of the digest value.

According to the second aspect of the present invention, in the information processing apparatus, the BIOS storage unit may be configured to be accessible from the main controller via the sub-controller.

According to the third aspect of the present invention, in the information processing apparatus, the digest computation unit may compute the digest value in response to starting of an operation of the sub-controller.

According to the fourth aspect of the present invention, in the information processing apparatus, the digest computation unit may compute the digest value in response to a digest value computation request from the main controller.

According to the fifth aspect of the present invention, in the information processing apparatus, the digest computation unit may compute the digest value in response to starting of an operation of the sub-controller in a case of a first mode in which power is supplied from an external power source, and compute the digest value in response to a digest value computation request from the main controller in a case of a second mode in which power is supplied from a built-in battery of the information processing apparatus.

According to the sixth aspect of the present invention, in the information processing apparatus, the main controller may acquire the digest value from the sub-controller, compare the acquired digest value with a valid digest value obtained in advance, and determine the validity of the BIOS program on the basis of a comparison result between the digest values.

According to the seventh aspect of the present invention, in the information processing apparatus, the sub-controller may compare the digest value computed by the digest computation unit with a valid digest value obtained in advance, and transmit a comparison result between the digest values to the main controller, and the main controller may acquire the comparison result from the sub-controller, and determine the validity of the BIOS program on the basis of the acquired comparison result.

The above-described aspects of the present invention can reduce a system startup time.

DETAILED DESCRIPTION OF THE INVENTION

Hereinafter, a description will be made of an information processing apparatus according to an embodiment of the present invention with reference to the drawings.

First Embodiment

Figure 1:
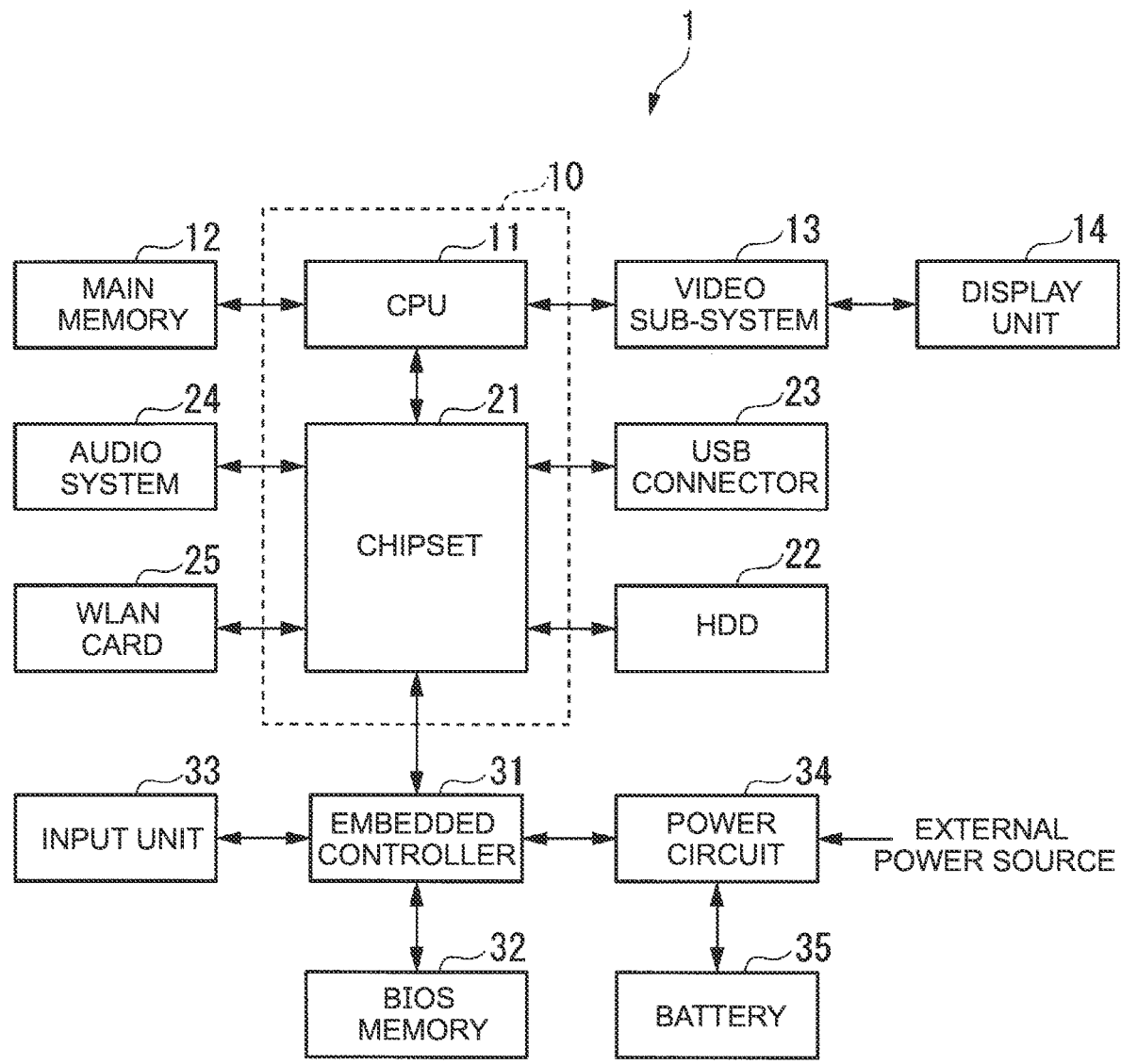
FIG. 1 is a diagram illustrating an example of a principal hardware configuration of a laptop PC according to a first embodiment.

FIG. 1 is a diagram illustrating an example of a principal hardware configuration of a laptop PC 1 according to a first embodiment. In the present embodiment, the laptop PC 1 will be described as an example of the information processing apparatus.

As illustrated in FIG. 1, the laptop PC 1 includes a CPU 11, a main memory 12, a video sub-system 13, a display unit 14, a chipset 21, an HDD 22, a USB connector 23, an audio system 24, a WLAN card 25, an embedded controller (EC) 31, a BIOS memory 32, an input unit 33, and a power circuit 34. In the present embodiment, the CPU 11 and the chipset 21 correspond to a main controller 10.

The central processing unit (CPU) 11 executes various computation processes under the program control, and thus controls the whole laptop PC 1.

The main memory 12 is a writable memory used as a read region for a program executed by the CPU 11 or a work region into which data processed by the executed program is written. The main memory 12 is configured with, for example, a plurality of dynamic random access memory (DRAM) chips. The executed program includes a Basic Input Output System (BIOS) program, an OS, various drivers for operating peripheral apparatuses in hardware, various services/utilities, and application programs.

The video sub-system 13 is a sub-system realizing functions related to image display, and includes a video controller. The video controller processes a drawing command from the CPU 11, writes processed drawing information into a video memory, reads the drawing information from the video memory, and outputs the drawing information as drawing data (display data) to the display unit 14.

The display unit 14 is, for example, a liquid crystal display, and displays a display screen based on the drawing data (display data) output from the video sub-system 13.

The chipset 21 is provided with controllers such as Universal Serial Bus (USB), Serial AT Attachment (ATA), a Serial Peripheral Interface (SPI) bus, a Peripheral Component Interconnect (PCI) bus, a PCI-Express bus, and an Embedded Serial Peripheral Interface (eSPI) bus, and is coupled to a plurality of devices. In FIG. 1, as examples of the devices, the HDD 22, the USB connector 23, the audio system 24, the WLAN card 25, and the embedded controller 31 are coupled to the chipset 21.

The hard disk drive (HDD) 22 stores the OS, the various drivers, the various services/utilities, the application programs, and various pieces of data.

The USB connector 23 is a connector for coupling to peripheral apparatuses using USB.

The audio system 24 records, reproduces, and output sound data.

The wireless local area network (WLAN) card 25 is coupled to a network via a wireless LAN, and performs data communication.

The embedded controller 31 (an example of a sub-controller) is a one-chip microcomputer that monitors and controls various devices (peripheral devices or sensors) regardless of a system status of the laptop PC 1. The embedded controller 31 has a power management function of controlling the power circuit 34. The embedded controller 31 is configured with a CPU, a ROM, a RAM, and the like (not illustrated), and is provided with A/D input terminals and D/A output terminals corresponding to a plurality of channels, a timer, and digital input and output terminals. The embedded controller 31 is coupled to, for example, the input unit 33 and the power circuit 34 via the input and output terminals, and the embedded controller 31 controls operations thereof.

The embedded controller 31 has SPI, and is coupled to the BIOS memory 32 via the SPI. In the present embodiment, the BIOS memory 32 is coupled to the embedded controller 31 according to, for example, a Slave Attached Flash method, and the main controller 10 may access the BIOS memory 32 via the embedded controller 31. In the Slave Attached Flash method, the main controller 10 serving as a master is coupled to the embedded controller 31 serving as a slave, and the embedded controller 31 is coupled to the BIOS memory 32 serving as a slave. Due to the coupling, the embedded controller 31 can access the BIOS memory 32, and the main controller 10 can access the BIOS memory 32 via the embedded controller 31.

The embedded controller 31 controls the power circuit 34 according to a system status (for example, the S0 status to the S5 status) defined in an Advanced Configuration and Power Interface (ACPI) specification. Here, the S0 status is the most active status, and a normal working status (normal operation status). The S1 status to the S5 status are different sleep statuses (standby power modes for power saving) that are statuses in which stopping of the supply of clocks or stopping of the supply of power to each constituent element of the laptop PC 1 is performed.

The embedded controller 31 can detect a case where the laptop PC 1 is supplied with power from an external power source (in a case of a first mode) and a case where the laptop PC 1 (its own apparatus) is supplied with power from a built-in battery 35 (in a case of a second mode), by using the power circuit 34.

The BIOS memory 32 (an example of a BIOS storage unit) is configured with an electrically rewritable nonvolatile memory such as an electrically erasable programmable read only memory (EEPROM) or a flash ROM. The BIOS memory 32 is coupled to the embedded controller 31 to be accessible from the main controller 10 via the embedded controller 31 according to a method such as the Slave Attached Flash method, and the BIOS memory 32 is configured to be accessible from the main controller 10 via the embedded controller 31. The BIOS memory 32 stores BIOS, and system firmware for controlling the embedded controller 31 or the like. The BIOS memory 32 stores, for example, a BIOS program and various pieces of setting information. The BIOS memory 32 stores digest values obtained in advance from BIOS program data.

The input unit 33 is an input device such as a keyboard, a pointing device, or a touch pad.

The power circuit 34 includes, for example, a DC/DC converter and a charge/discharge unit, and converts external power from an AC/DC adaptor or a DC voltage supplied from the battery 35 into a plurality of voltages required to operate the laptop PC 1. The power circuit 34 supplies power to each unit of the laptop PC 1 under the control of the embedded controller 31. The power circuit 34 detects a case where the laptop PC 1 is supplied with power from an external power source (in a case of the first mode) and a case where the laptop PC 1 (its own apparatus) is supplied with power from the built-in battery 35 (in a case of the second mode), and outputs a detection result to the embedded controller 31.

The battery 35 is, for example, a lithium ion battery, and is charged by the power circuit 34 in a case where external power from the AC/DC adaptor is supplied. The battery 35 supplies power to each constituent element of the laptop PC 1 via the power circuit 34 in a state in which external power from the AC/DC adaptor is not supplied.

Next, with reference to FIG. 2, a description will be made of a functional configuration of the laptop PC 1 according to the present embodiment.

Figure 2:
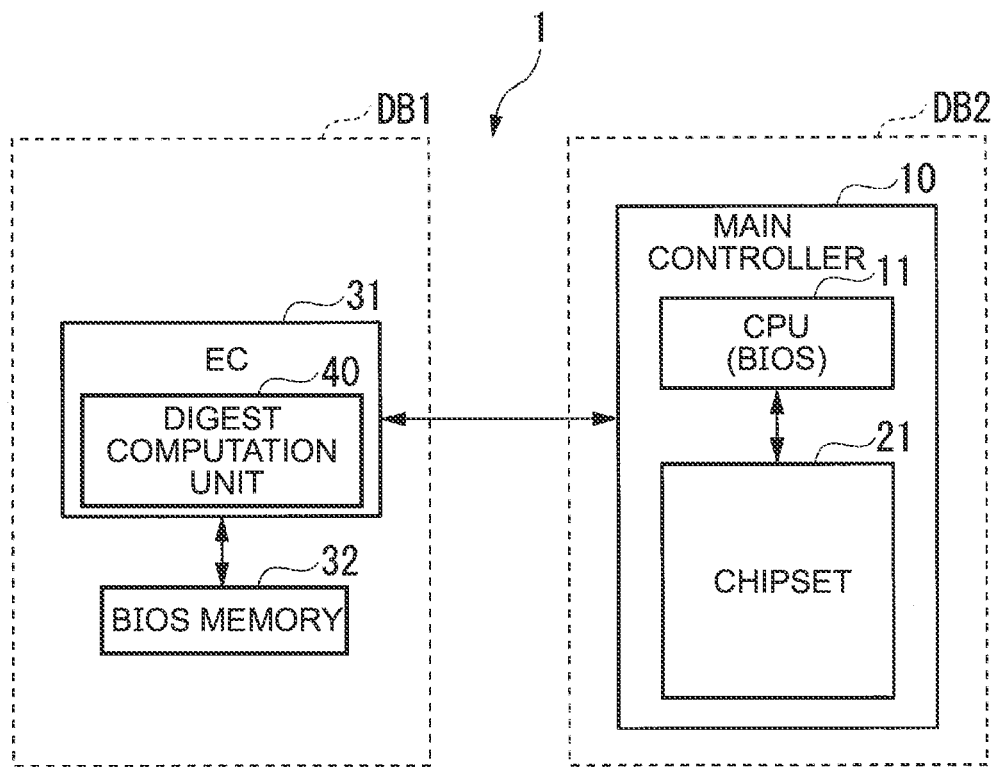
FIG. 2 is a block diagram illustrating an example of a functional configuration of the laptop PC according to the first embodiment.

FIG. 2 is a block diagram illustrating an example of a functional configuration of the laptop PC 1 according to the present embodiment.

As illustrated in FIG. 2, the laptop PC 1 includes the main controller 10 and the embedded controller (EC) 31. FIG. 2 illustrates only principal functional configurations related to the invention of the present embodiment.

In FIG. 2, the main controller 10 and the embedded controller 31 are supplied with power with different levels from the power circuit 34. The embedded controller 31 is included in a power block DB1, and is supplied with power earlier than the main controller 10. The main controller 10 is included in a power block DB2, and is supplied with power after power is supplied to the power block DB1.

For example, in a case where the laptop PC 1 is supplied with power from an external power source (in a case of the first mode), power is supplied to the embedded controller 31 of the power block DB1, and power is supplied to the main controller 10 of the power block DB2 when a startup request for the laptop PC 1 is received via the input unit 33.

In a case where the AC/DC adaptor is not coupled, and thus the laptop PC 1 is not supplied with power from the external power source (in a case of the second mode), power is successively supplied in an order of the power block DB1 and the power block DB2 when a startup request for the laptop PC 1 is received via the input unit 33. In other words, in a case where the laptop PC 1 (its own apparatus) is supplied with power from the built-in battery 35 (in a case of the second mode), power is successively supplied to the embedded controller 31 and the main controller 10 when the startup request for the laptop PC 1 is received via the input unit 33.

The embedded controller 31 includes a digest computation unit 40.

The digest computation unit 40 computes a digest value on the basis of the BIOS program data stored in the BIOS memory 32. Here, the digest value is information computed by using, for example, a hash function on the basis of the BIOS program data, and is uniquely determined on the basis of the BIOS program data. The digest value is information for verifying that the BIOS program data is not altered (validity of a BIOS program).

The digest computation unit 40 may compute a digest value on the basis of the BIOS program data stored in the BIOS memory 32 in parallel to execution of a process (for example, a process based on the BIOS program) in the main controller 10.

For example, in a case of the first mode, the digest computation unit 40 computes a digest value in response to starting of an operation of the embedded controller 31. For example, in a case of the second mode, the digest computation unit 40 computes a digest value in response to a digest value computation request from the main controller 10.

The embedded controller 31 computes a digest value on the basis of the BIOS program data by using the digest computation unit 40. The embedded controller 31 transmits the digest value computed by the digest computation unit 40 to the main controller 10.

The main controller 10 includes the CPU 11 and the chipset 21, and starts up the OS (for example, Windows (registered trademark)) by executing the BIOS program.

The main controller 10 starts up the OS, and then executes various applications operated on the OS. The main controller 10 executes a POST process by using the BIOS when the OS is started up. The main controller 10 determines the validity of the BIOS program on the basis of, for example, the digest value computed by the digest computation unit 40. In other words, the main controller 10 executes integrity checking for the BIOS program by executing the BIOS program.

For example, the main controller 10 acquires the digest value computed by the digest computation unit 40 from the embedded controller 31, and also acquires a digest value (valid digest value) for comparison obtained in advance, stored in the BIOS memory 32 via the embedded controller 31. The main controller 10 compares the digest value computed by the digest computation unit 40 with the valid digest value stored in the BIOS memory 32, and determines the validity of the BIOS program on the basis of a comparison result therebetween. In a case where the comparison result indicates matching, the main controller 10 determines that the BIOS program is valid.

Next, with reference to the drawing, a description will be made of an operation of the laptop PC 1 according to the present embodiment.

Figure 3:
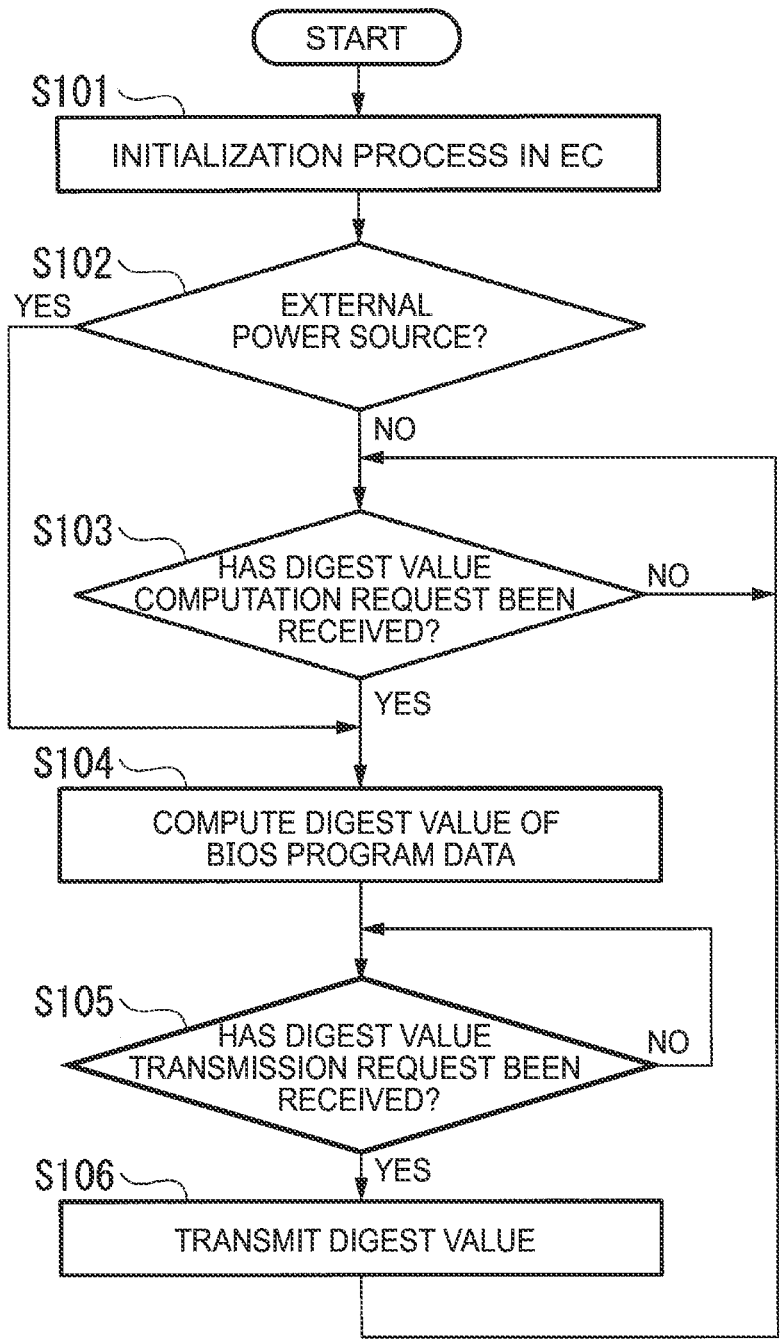
FIG. 3 is a flowchart illustrating an example of a digest value computation process executed by an EC in the first embodiment.

FIG. 3 is a flowchart illustrating an example of a digest value computation process executed by the embedded controller 31 in the present embodiment.

As illustrated in FIG. 3, in a case where the embedded controller 31 is supplied with power and thus starts an operation, first, the embedded controller 31 executes an initialization process of the embedded controller 31 (step S101).

Next, the embedded controller 31 determines whether or not external power is supplied thereto (step S102). The embedded controller 31 acquires, from the power circuit 34, information regarding whether or not external power is supplied, and determines whether or not the AC/DC adaptor is coupled and the external power is supplied. In a case where the external power is supplied (step S102: YES; a case of the first mode), the embedded controller 31 causes the process to proceed to step S104. In a case where the external power is not supplied (step S102: NO; a case of the second mode), the embedded controller 31 causes the process to proceed to step S103.

In step S103, the embedded controller 31 determines whether or not a digest value computation request has been received. In a case where the digest value computation request has been received from the main controller 10 (step S103: YES), the embedded controller 31 causes the process to proceed to step S104. In a case where the digest value computation request has not been received from the main controller 10 (step S103: NO), the embedded controller 31 returns the process to step S103.

In step S104, the embedded controller 31 computes a digest value of BIOS program data. The embedded controller 31 causes the digest computation unit 40 to compute the digest value, and the digest computation unit 40 computes the digest value by using a hash function or the like on the basis of the BIOS program data stored in the BIOS memory 32. In other words, the embedded controller 31 reads the BIOS program data stored in the BIOS memory 32, and computes the digest value by using the hash function or the like.

Next, the embedded controller 31 determines whether or not a digest value transmission request has been received (step S105). In a case where the digest value transmission request has been received from the main controller 10 (step S105: YES), the embedded controller 31 causes the process to proceed to step S106. In a case where the digest value transmission request has not been received from the main controller 10 (step S105: NO), the embedded controller 31 returns the process to step S105.

In step S106, the embedded controller 31 transmits the digest value to the main controller 10. In other words, the embedded controller 31 transmits the digest value computed by the digest computation unit 40 to the main controller 10. After the process in step S106, the embedded controller 31 returns the process to step S103.

Next, with reference to FIGS. 4 and 5, a description will be made of a startup process in the laptop PC 1 according to the present embodiment.

Figure 4:
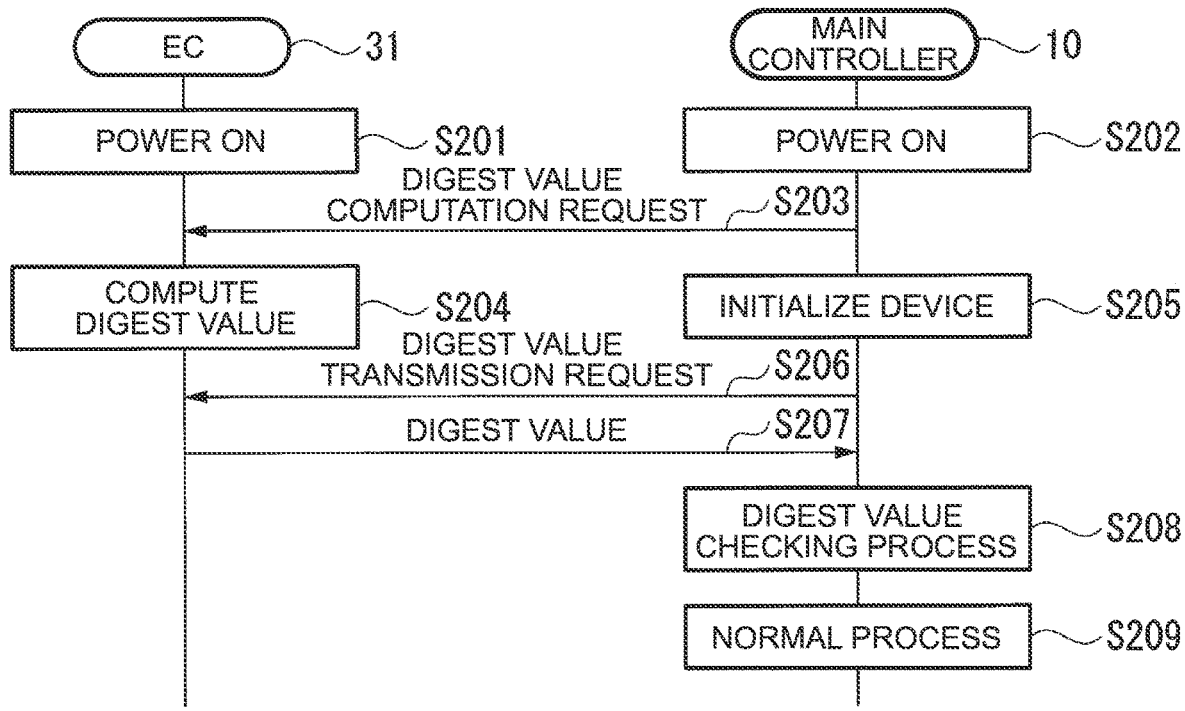
FIG. 4 is a diagram illustrating an example of a startup process in the laptop PC in a case where power is supplied from a battery in the first embodiment.

FIG. 4 is a diagram illustrating an example of a startup process in the laptop PC 1 in a case where power is supplied from the battery 35 (in a case of the second mode) in the present embodiment.

As illustrated in FIG. 4, in a case of the second mode, when a startup request for the laptop PC 1 is received via the input unit 33, power is supplied to the power block DB1 and the power block DB2, and the embedded controller 31 is first brought into a state of power ON and starts an operation (step S201).

The main controller 10 is brought into a state of power ON, and starts an operation (step S202).

Next, the main controller 10 transmits a digest value computation request to the embedded controller 31 (step S203).

The embedded controller 31 computes a digest value in response to reception of the digest value computation request from the main controller 10 (step S204). The digest computation unit 40 of the embedded controller 31 computes the digest value by using a hash function or the like on the basis of BIOS program data stored in the BIOS memory 32. In other words, the digest computation unit 40 reads the BIOS program data stored in the BIOS memory 32 by using the SPI, and computes the digest value by using the hash function or the like.

The main controller 10 executes device initialization while the embedded controller 31 is computing the digest value (step S205). The main controller 10 executes an initialization process of various devices provided in the laptop PC 1 in parallel to the digest value computation process executed by the embedded controller 31.

Next, the main controller 10 transmits a digest value transmission request to the embedded controller 31 (step S206).

Next, the embedded controller 31 transmits the digest value to the main controller 10 in response to reception of the digest value transmission request from the main controller 10 (step S207). In other words, the embedded controller 31 transmits the digest value of the BIOS program data computed by the digest computation unit 40, to the main controller 10.

Next, the main controller 10 executes a digest value checking process (step S208). The main controller 10 compares the digest value received from the embedded controller 31 with a digest value stored in the BIOS memory 32, and determines the validity of the BIOS program on the basis of a comparison result therebetween.

For example, in a case where the BIOS program is valid (in a case where there is no problem in an integrity checking result), the main controller 10 proceeds to normal processes (step S209) including an OS startup process. For example, in a case where the BIOS program is not valid (in a case where there is a problem in the integrity checking result), the main controller 10 stops the process, and shuts down the system without executing the OS startup process.

Next, in step S209 (in a case where the BIOS program is valid), the main controller 10 executes the normal processes including the OS startup process, and completes startup of the OS.

Figure 5:
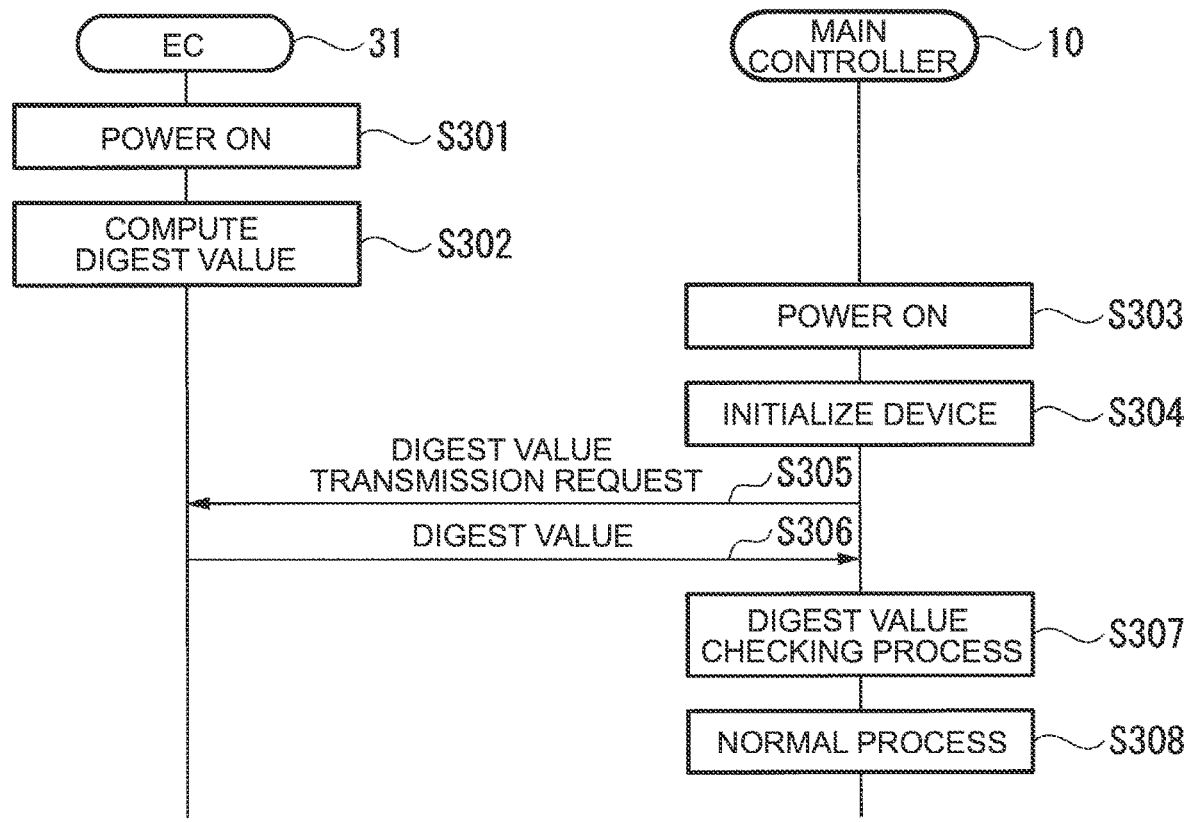
FIG. 5 is a diagram illustrating an example of a startup process in the laptop PC in a case where power is supplied from an external power source in the first embodiment.

Next, FIG. 5 is a diagram illustrating an example of a startup process in the laptop PC 1 in a case where power is supplied from an external power source (in a case of the first mode) in the present embodiment.

As illustrated in FIG. 5, in a case of the first mode, first, the AC/DC adaptor is coupled to the laptop PC 1 such that power is supplied to the power block DB1, and thus the embedded controller 31 is brought into a state of power ON and starts an operation (step S301).

Next, the embedded controller 31 computes a digest value in response to starting of the operation of the embedded controller 31 (step S302). The digest computation unit 40 of the embedded controller 31 computes the digest value by using a hash function or the like on the basis of BIOS program data stored in the BIOS memory 32. In other words, the digest computation unit 40 reads the BIOS program data stored in the BIOS memory 32 by using the SPI, and computes the digest value by using the hash function or the like.

On the other hand, when a startup request for the laptop PC 1 is received via the input unit 33, power is supplied to the power block DB1, and the main controller 10 is first brought into a state of power ON and starts an operation (step S303).

Next, the main controller 10 executes device initialization (step S304). The main controller 10 executes an initialization process of various devices provided in the laptop PC 1.

The subsequent processes in step S305 to step S308 are the same as the processes in step S206 to step S209 illustrated in FIG. 4, and thus description thereof will not be repeated here.

In the above-described example, a description has been made of an example in which the embedded controller 31 automatically computes a digest value in response to starting of an operation of the embedded controller 31 when power is supplied thereto from an external power source, but this is only an example. For example, in a case where a digest value is computed again in the process in the above step S308, the embedded controller 31 may compute the digest value in response to a digest value computation request in the same manner as in FIG. 4.

Figure 6:
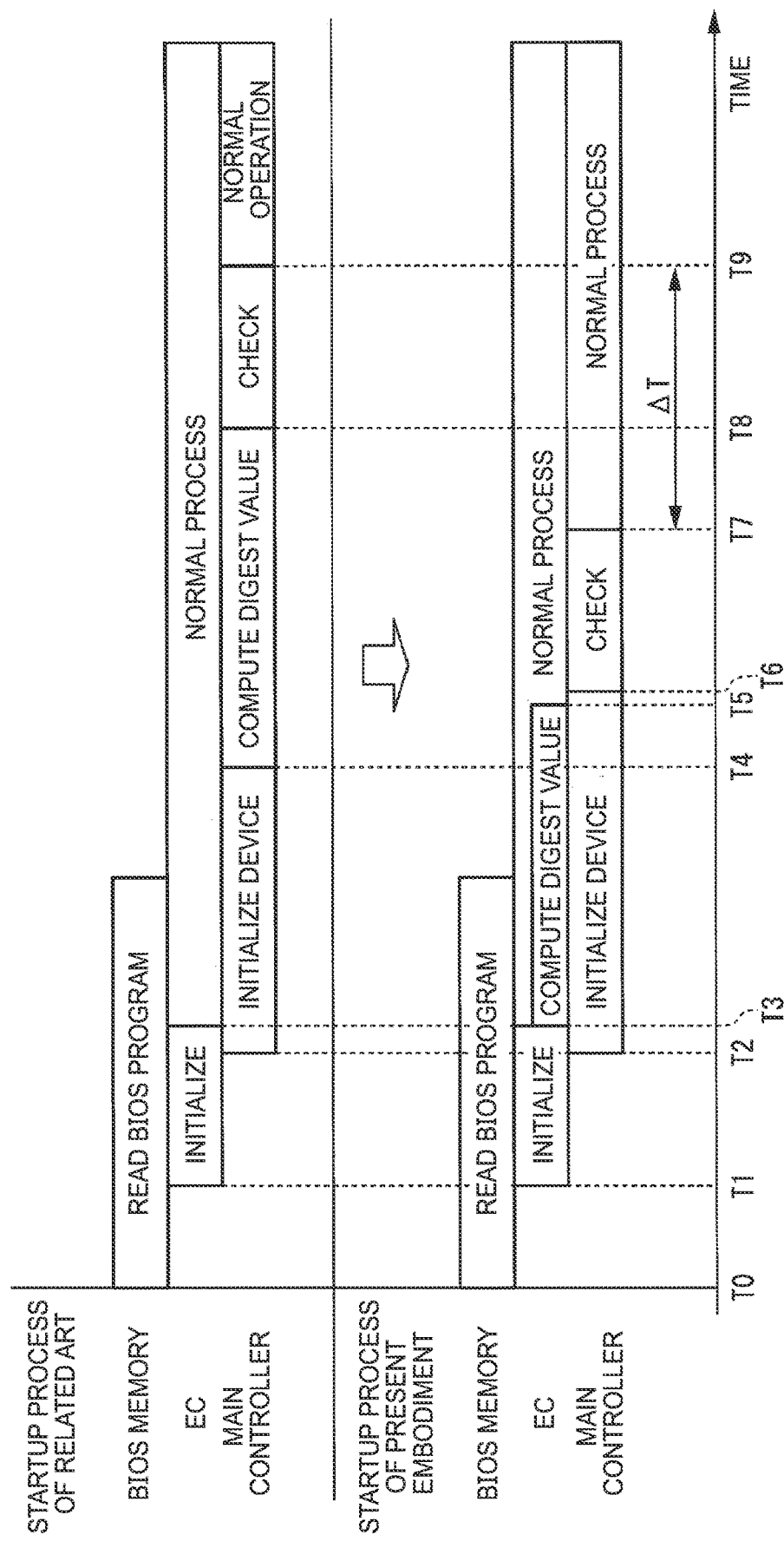
FIG. 6 is a diagram for describing an example of a startup process in the laptop PC in the first embodiment.

Next, with reference to FIG. 6, a detailed description of a startup process in the laptop PC 1 in the present embodiment.

FIG. 6 is a diagram for describing an example of a startup process in the laptop PC 1 in the present embodiment. In FIG. 6, a description will be made of a startup process in the laptop PC 1 in a case of the second mode in which power is supplied from the battery 35.

In FIG. 6, for comparison with the present embodiment, a startup process of the related art is illustrated on an upper part, and a startup process of the present embodiment is illustrated on a lower part.

First, in the startup process of the related art on the upper part in FIG. 6, in a case where power is supplied to the power block DB1 and the power block DB2 at time point T0, a stored BIOS program is read from a BIOS memory of the related art by using, for example, a Direct Memory Access (DMA) function, and is stored (loaded) into the main memory 12.

At time point T1, an embedded controller of the related art starts an operation, and executes an initialization process.

At time point T2, a main controller of the related art starts an operation based on a BIOS program, and executes an initialization process of various devices.

Next, at time point T3, the embedded controller of the related art executes a normal process after the initialization process is finished.

The main controller of the related art executes a process of computing a digest value of the BIOS program data at time point T4 after the initialization process of the various devices is finished, and executes digest value checking (integrity checking) at time point T8.

Next, at time point T9, the main controller of the related art executes a normal process.

As mentioned above, in the startup process of the related art, as a startup time, a period from time point T0 to time point T9 is necessary.

In contrast, in the startup process of the present embodiment on the lower part, in a case where power is supplied to the power block DB1 and the power block DB2 at time point T0, the stored BIOS program is read from the BIOS memory 32 by using, for example, a DMA function, and is stored (loaded) into the main memory 12.

At time point T1, the embedded controller 31 starts an operation, and executes an initialization process of the embedded controller 31.

At time point T2, the main controller 10 starts an operation based on the BIOS program, transmits a digest value computation request to the embedded controller 31, and also executes an initialization process of various devices.

Next, in a case where the initialization process is finished, at time point T3, the embedded controller 31 executes a process of computing a digest value of the BIOS program data in response to the digest value computation request. The digest computation unit 40 of the embedded controller 31 reads the BIOS program data stored in the BIOS memory 32 by using the SPI, and computes the digest value by using a hash function or the like. As mentioned above, in the laptop PC 1 of the present embodiment, the embedded controller 31 computes the digest value of the BIOS program data in parallel to the initialization process executed by the main controller 10.

Next, in a case where the process of computing the digest value in the embedded controller 31 is finished at time point T5, and the initialization process in the main controller 10 is finished at time point T6, the main controller 10 executes digest value checking (integrity checking). For example, the main controller 10 transmits a digest value transmission request to the embedded controller 31, and acquires the digest value from the embedded controller 31. The main controller 10 compares the digest value received from the embedded controller 31 with a digest value stored in the BIOS memory 32, and determines the validity of the BIOS program on the basis of a comparison result therebetween.

Next, in a case where the digest value checking is normally finished, at time point T7, the main controller 10 executes a normal process.

As mentioned above, in the startup process of the present embodiment, as a startup time, a period from time point T0 to time point T7 is necessary. In other words, in the startup process of the present embodiment, a startup time can be reduced by a period ΔT from time point T7 to time point T9 compared with the related art on the upper part.

As described above, the laptop PC 1 (information processing apparatus) according to the present embodiment includes the BIOS memory 32 (BIOS storage unit), the main controller 10 (the CPU 11 and the chipset 21), and the embedded controller 31 (sub-controller). The BIOS memory 32 stores at least a BIOS program. The main controller 10 starts up the operating system by executing the BIOS program. The embedded controller 31 manages peripheral apparatuses, accesses the BIOS memory 32, and includes the digest computation unit 40 that computes a digest value on the basis of BIOS program data stored in the BIOS memory 32 in parallel to execution of a process in the main controller 10. The main controller 10 determines the validity of a BIOS program on the basis of the digest value computed by the digest computation unit 40.

Consequently, in the laptop PC 1 according to the present embodiment, as illustrated in FIG. 6 described above, the main controller 10 can execute processes other than a digest value computation process while the embedded controller 31 is computing a digest value of BIOS program data. Thus, the laptop PC 1 according to the present embodiment can reduce a system startup time (refer to the period ΔT in FIG. 6).

In the present embodiment, the BIOS memory 32 is configured to be accessible from the main controller 10 via the embedded controller 31 (for example, the BIOS memory 32 is configured according to the Slave Attached Flash method). In other words, the main controller 10 may access the BIOS memory 32 via the embedded controller 31.

Consequently, in the laptop PC 1 according to the present embodiment, the embedded controller 31 can access the BIOS memory 32 alone during execution of a process based on a BIOS program in the main controller 10. Thus, in the laptop PC 1 according to the present embodiment, a digest value of BIOS program data can be computed during execution of a process in the main controller 10.

In the present embodiment, the digest computation unit 40 computes a digest value of BIOS program data in response to starting of an operation of the embedded controller 31.

Consequently, in the laptop PC 1 according to the present embodiment, the embedded controller 31 automatically starts computation of the digest value of the BIOS program data, and thus it is possible to more efficiently reduce a system startup time.

In the present embodiment, the digest computation unit 40 computes a digest value of BIOS program data in response to a digest value computation request from the main controller 10.

Consequently, in the laptop PC 1 according to the present embodiment, the main controller 10 transmits the digest value computation request, and thus it is possible to compute the digest value as appropriate, for example, after an OS is started up. Thus, in the laptop PC 1 according to the present embodiment, the validity of a BIOS program can be checked in a case except OS startup, and thus it is possible to prevent an unauthorized program from being executed.

In the present embodiment, in a case of the first mode in which power is supplied from an external power source, the digest computation unit 40 computes a digest value in response to starting of an operation of the embedded controller 31. In a case of the second mode in which power is supplied from the built-in battery 35 of its own apparatus, the digest computation unit 40 computes a digest value in response to a digest value computation request from the main controller 10.

Consequently, the laptop PC 1 according to the present embodiment switches methods of starting a digest value computation process to each other depending on whether or not power is supplied from an external power source, and can thus efficiently reduce an OS startup time according to the modes regarding whether or not power is supplied from the external power source.

In the present embodiment, the main controller 10 acquires a digest value from the embedded controller 31, compares the acquired digest value with a valid digest value obtained in advance, and determines the validity of a BIOS program on the basis of a comparison result therebetween.

Consequently, in the laptop PC 1 according to the present embodiment, the main controller 10 acquires a computed digest value from the embedded controller 31, and can thus leave the acquired digest value as a history of integrity checking or use the digest value for other processes.

Second Embodiment

Next, with reference to the drawings, a description will be made of a laptop PC 1 according to a second embodiment.

In the present embodiment, a description will be made of a modification example in which the embedded controller 31 executes a digest value comparison process executed by the main controller 10 in the first embodiment.

A principal hardware configuration and functional configuration of the laptop PC 1 according to the second embodiment are the same as those in the first embodiment illustrated in FIGS. 1 and 2, and thus description thereof will not be repeated here.

In the present embodiment, the embedded controller 31 compares a digest value computed by the digest computation unit 40 with a valid digest value obtained in advance, and transmits a comparison result therebetween to the main controller 10. The main controller 10 acquires the comparison result from the embedded controller 31, and determines the validity of a BIOS program on the basis of the acquired comparison result.

Next, with reference to the drawing, a description will be made of an operation of the laptop PC 1 according to the present embodiment.

Figure 7:
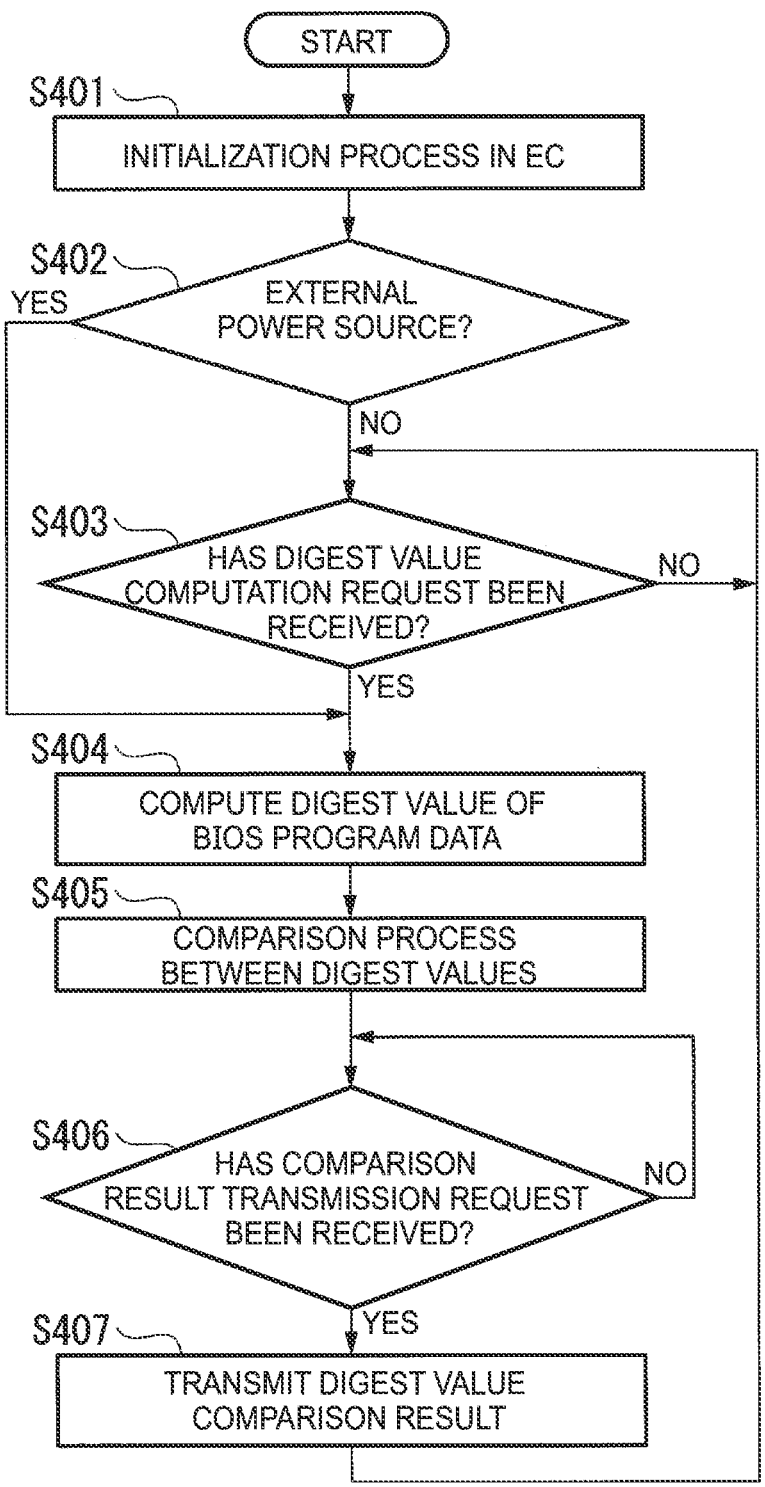
FIG. 7 is a flowchart illustrating an example of a digest value computation process executed by an EC in a second embodiment.

FIG. 7 is a flowchart illustrating an example of a digest value computation process executed by the embedded controller 31 in the present embodiment.

As illustrated in FIG. 7, in a case where the embedded controller 31 is supplied with power and thus starts an operation, processes in step S401 to step S404 are the same as the processes in step S101 to step S104 illustrated in FIG. 3, and thus description thereof will not be repeated here.

The embedded controller 31 computes a digest value of the BIOS program data in step S404, and then executes a digest value comparison process (step S405). The embedded controller 31 compares the digest value computed by the digest computation unit 40 with a valid digest value stored in the BIOS memory 32. The embedded controller 31 generates a comparison result indicating whether or not the digest value computed by the digest computation unit 40 matches the valid digest value stored in the BIOS memory 32 as a result of the comparison.

Next, the embedded controller 31 determines whether or not a transmission request for the digest value comparison result has been received (step S406). In a case where the transmission request for the digest value comparison result has been received from the main controller (step S406: YES), the embedded controller 31 causes process to proceed to step S407. In a case where transmission request for the digest value comparison result has not been received from the main controller 10 (step S406: NO), the embedded controller 31 returns the process to step S406.

In step S407, the embedded controller 31 transmits the digest value comparison result to the main controller 10. In other words, the embedded controller 31 transmits the digest value comparison result as a result of the comparison process in the above step S405 to the main controller 10. After the process in step S407, the embedded controller 31 returns the process to step S403.

Next, with reference to FIGS. 8 and 9, a description will be made of a startup process in the laptop PC 1 according to the present embodiment.

Figure 8:
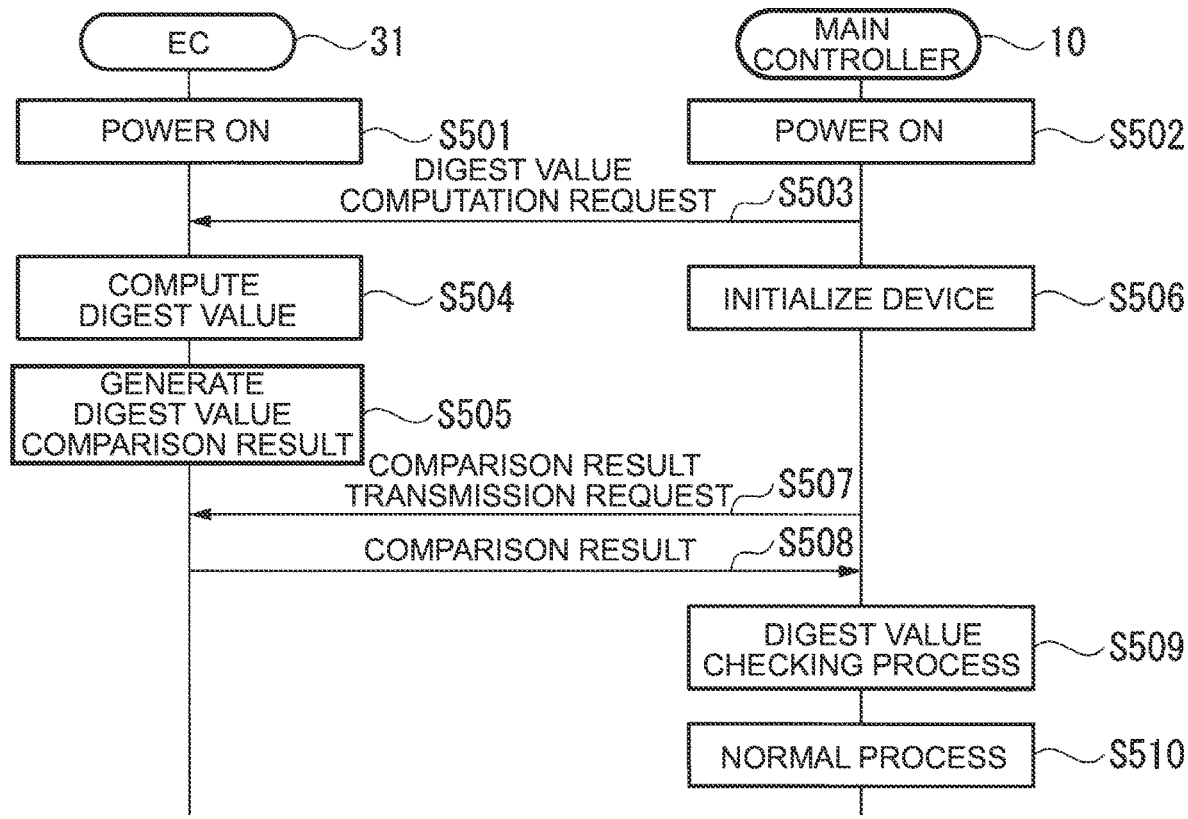
FIG. 8 is a diagram illustrating an example of a startup process in a laptop PC in a case where power is supplied from a battery in the second embodiment.

FIG. 8 is a diagram illustrating an example of a startup process in the laptop PC 1 in a case where power is supplied from the battery 35 (in a case of the second mode) in the present embodiment.

As illustrated in FIG. 8, in a case of the second mode, when a startup request for the laptop PC 1 is received via the input unit 33, power is supplied to the power block DB1 and the power block DB2. Processes in step S501 to step S504 illustrated in FIG. 8 are the same as the processes in step S201 to step S204 illustrated in FIG. 4, and thus description thereof will not be repeated here.

In step S505, the embedded controller 31 generates a digest value comparison result. In other words, the embedded controller 31 compares the digest value computed by the digest computation unit 40 with a valid digest value stored in the BIOS memory 32, and generates the comparison result.

The main controller 10 executes device initialization while the embedded controller 31 is computing the digest value (step S506). The main controller 10 executes an initialization process of various devices provided in the laptop PC 1 in parallel to the digest value computation process executed by the embedded controller 31.

Next, the main controller 10 transmits a transmission request for the digest value comparison result to the embedded controller 31 (step S507).

Next, the embedded controller 31 transmits the digest value comparison result to the main controller 10 in response to reception of the transmission request for the comparison result from the main controller 10 (step S508).

Next, the main controller 10 executes a digest value checking process (step S509). The main controller 10 determines the validity of a BIOS program on the basis of the digest value comparison result received from the embedded controller 31. For example, in a case where the BIOS program is valid, the main controller 10 proceeds to normal processes (step S510) including an OS startup process. In a case where the BIOS program is not valid, the main controller 10 stops the process, and shuts down the system without executing the OS startup process.

Next, in step S510 (in a case where the BIOS program is valid), the main controller 10 executes the normal processes including the OS startup process, and completes startup of the OS.

Figure 9:
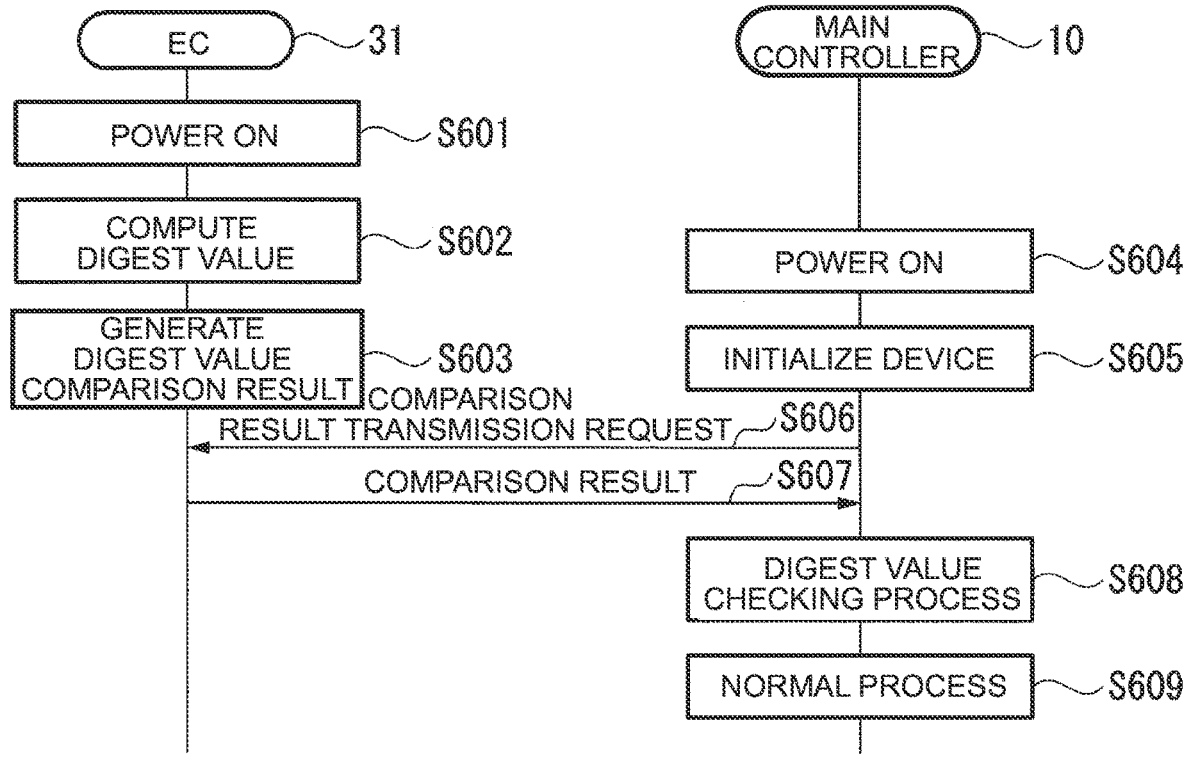
FIG. 9 is a diagram illustrating an example of a startup process in the laptop PC in a case where power is supplied from an external power source in the second embodiment.

Next, FIG. 9 is a diagram illustrating an example of a startup process in the laptop PC 1 in a case where power is supplied from an external power source (in a case of the first mode) in the present embodiment.

As illustrated in FIG. 9, in a case of the first mode, first, the AC/DC adaptor is coupled to the laptop PC such that power is supplied to the power block DB1. Processes in step S601 and step S602 are the same as the processes in step S301 and step S302 illustrated in FIG. 6, and thus description thereof will not be repeated here.

A process in step S603 is the same as the process in step S505 illustrated in FIG. 8, and thus description thereof will not be repeated here.

On the other hand, when a startup request for the laptop PC 1 is received via the input unit 33, power is supplied to the power block DB1, and the main controller 10 is first brought into a state of power ON and starts an operation (step S604). The main controller 10 executes device initialization (step S605).

The subsequent processes in step S606 to step S609 are the same as the processes in step S507 to step S510 illustrated in FIG. 8, and thus description thereof will not be repeated here.

As described above, in the laptop PC 1 according to the present embodiment, the embedded controller 31 compares a digest value computed by the digest computation unit 40 with a valid digest value obtained in advance, and transmits a comparison result therebetween to the main controller 10. The main controller 10 acquires the comparison result from the embedded controller 31, and determines the validity of a BIOS program on the basis of the acquired comparison result.

Consequently, in the laptop PC 1 according to the present embodiment, the embedded controller 31 performs not only a digest value computation process but also a digest value comparison process in parallel to a process in the main controller 10, and thus it is possible to further reduce an OS startup time.

The present invention is not limited to each of the embodiments, and may be changed within the scope without departing from the concept of the present invention.

For example, in the above-described respective embodiments, a description has been made of an example of a case where an information processing apparatus is the laptop PC 1, but the information processing apparatus is not limited thereto. The information processing apparatus may be other apparatuses such as a tablet terminal apparatus or a desktop PC.

In the above-described respective embodiments, a description has been made of an example in which the embedded controller 31 (digest computation unit 40) computes a digest value of BIOS program data, but the embedded controller 31 is not limited thereto. The embedded controller 31 (digest computation unit 40) may compute, for example, a digest value of another program or another piece of data stored in the BIOS memory 32, or a digest value of a data or a program stored in a device other than the BIOS memory 32.

In the above-described respective embodiments, a description has been made of an example in which the embedded controller 31 (digest computation unit 40) computes a digest value of the overall BIOS program data, but the embedded controller 31 is not limited thereto. The embedded controller 31 (digest computation unit 40) may compute, for example, a digest value for each partial function, phase (hierarchy), or predetermined region of the BIOS.

In the above-described respective embodiments, a description has been made of an example in which the laptop PC 1 computes a digest value and checks the integrity of a BIOS program when an OS is started up, but the laptop PC 1 is not limited thereto. In the laptop PC 1, the embedded controller 31 (digest computation unit 40) may compute a digest value and check integrity, for example, when returning from a waiting mode (for example, the S1 status to the S5 status) such as a standby mode or a sleep mode occurs, or in various processes after an OS is started up.

Each configuration of the laptop PC 1 includes a computer system therein. A program for realizing a function of each configuration of the laptop PC 1 may be recorded on a computer readable recording medium, and the program recorded on the recording medium may be read to and executed by the computer system such that a process in each configuration of the laptop PC 1 is performed. Here, "the program recorded on the recording medium being read to and executed by the computer system" includes that the program is installed in the computer system. The "computer system" mentioned here includes an OS or hardware such as peripheral apparatuses.

The "computer system" may include a plurality of computer apparatuses connected to each other via a network including a communication line such as the Internet, a WAN, a LAN, or a dedicated line. The "computer readable recording medium" indicates a portable medium such as a flexible disk, a magnetooptical disc, a ROM, or a CD-ROM, and a storage device such as a hard disk built into the computer system. As mentioned above, the recording medium storing the program may be a non-transitory recording medium such as a CD-ROM.

The recording medium includes a recording medium that is internally or externally provided and is accessible from a delivery server in order to deliver the program. The program may be divided into a plurality of programs, and the programs may be downloaded at different timings and may then be combined into one in the respective configurations of the laptop PC 1, or different delivery servers may deliver the respective divided programs. The "computer readable recording medium" includes a memory that holds the program for a predetermined time, such as a volatile memory (RAM) in a computer system serving as a server or a client in a case where the program is transmitted via a network. The program may realize some of the functions. The program may be a so-called differential file (differential program) that can realize the functions in combination with a program already recorded in the computer system.

Some or all of the functions may be realized by an integrated circuit such as large scale integration (LSI). The respective functions may be individually realized by processors, and some or all thereof may be integrally realized by a processor. A method of producing an integrated circuit is not limited to LSI, and an integrated circuit may be realized by a dedicated circuit or a general purpose processor. In a case where a technique for an integrated circuit replacing LSI appears with the advance of a semiconductor technique, an integrated circuit using the technique may be used.

The invention claimed is:

1. An information processing apparatus comprising:
   a BIOS storage unit that stores at least a Basic Input Output System (BIOS) program;
   a main controller that starts up an operating system by executing the BIOS program; and
   a sub-controller that manages peripheral apparatuses and from which the BIOS storage unit is accessible,
   wherein the sub controller includes a digest computation unit that computes a digest value on the basis of BIOS program data stored in the BIOS storage unit in parallel with execution of a process in the main controller, and
   wherein the main controller determines validity of the BIOS program on the basis of the digest value.

2. The information processing apparatus according to claim 1,
   wherein the BIOS storage unit is accessible from the main controller via the sub-controller.

3. The information processing apparatus according to claim 1,
   wherein the digest computation unit computes the digest value in response to starting of an operation of the sub-controller.

4. The information processing apparatus according to claim 1,
   wherein the digest computation unit computes the digest value in response to a digest value computation request from the main controller.

5. The information processing apparatus according to claim 1, wherein the digest computation unit computes the digest value in response to starting of an operation of the sub-controller in a first mode wherein power is supplied from an external power source, and computes the digest value in response to a digest value computation request from the main controller in a second mode wherein power is supplied from a built-in battery of the information processing apparatus.

6. The information processing apparatus according to claim 1, wherein the main controller acquires the digest value from the sub-controller, compares the acquired digest value with a valid digest value, and determines the validity of the BIOS program on the basis of a comparison result between the acquired and valid digest values.

7. The information processing apparatus according to claim 1, wherein the sub-controller compares the digest value computed by the digest computation unit with a valid digest value, and transmits a comparison result between the computed and valid digest values to the main controller, and wherein the main controller acquires the comparison result from the sub-controller, and determines the validity of the BIOS program on the basis of the acquired comparison result.

* * * * *